United States Patent
Jose et al.

(10) Patent No.: US 10,402,035 B1
(45) Date of Patent: Sep. 3, 2019

(54) CONTENT-DRIVEN ORCHESTRATION OF MULTIPLE RENDERING COMPONENTS IN USER INTERFACES OF ELECTRONIC DEVICES

(71) Applicant: INTUIT INC., Mountain View, CA (US)

(72) Inventors: Ann Catherine Jose, San Jose, CA (US); Eugene Krivopaltsev, San Jose, CA (US); Jay JieBing Yu, Encinatas, CA (US)

(73) Assignee: INTUIT INC., Mountain View, CA (US)

( * ) Notice: Subject to any disclaimer, the term of this patent is extended or adjusted under 35 U.S.C. 154(b) by 545 days.

(21) Appl. No.: 14/812,934

(22) Filed: Jul. 29, 2015

(51) Int. Cl.
  *G06F 3/048* (2013.01)
  *G06F 3/0481* (2013.01)
  *G06F 3/0484* (2013.01)

(52) U.S. Cl.
  CPC .......... *G06F 3/0481* (2013.01); *G06F 3/0484* (2013.01)

(58) Field of Classification Search
  CPC ...... G06F 9/44; G06F 3/0481; G06F 17/2247; G06F 17/22; H04L 29/08; H04L 67/10
  See application file for complete search history.

(56) References Cited

U.S. PATENT DOCUMENTS

| | | | |
|---|---|---|---|
| 6,694,482 B1 * | 2/2004 | Arellano | ........... G06F 16/40 715/251 |
| 6,754,668 B2 | 6/2004 | Noble et al. | |
| 6,782,370 B1 | 8/2004 | Stack | |
| 7,133,895 B1 | 11/2006 | Lee et al. | |
| 7,149,776 B1 | 12/2006 | Roy et al. | |
| 7,194,473 B1 | 3/2007 | Hichwa et al. | |
| 7,712,023 B1 | 5/2010 | Bryan | |
| 7,726,561 B2 | 6/2010 | Katyal et al. | |

(Continued)

FOREIGN PATENT DOCUMENTS

| | | |
|---|---|---|
| JP | 2009217676 A | 9/2009 |
| KR | 1020090042018 A | 4/2009 |

OTHER PUBLICATIONS

Gitana Software Inc., "Alpaca—HTML5 Forms for Jquerey-Form Buttons", Jun. 5, 2014, Retrieved from the Internet on Jul. 2, 2018: URL: https://web.archive.org/web/20140605100521/http://alpacajs.org:80/examples/components/form-controls/buttons.html (3 pages).

(Continued)

*Primary Examiner* — Rashawn N Tillery
(74) *Attorney, Agent, or Firm* — Patterson + Sheridan, LLP

(57) ABSTRACT

The disclosed embodiments provide a system that facilitates use of an application on an electronic device. During operation, the system executes an orchestrator that coordinates the operation of a set of rendering components for rendering different views of a user interface for the application. The orchestrator is used to provide the user interface on the electronic device. First, the orchestrator obtains content for rendering the user interface. Next, the orchestrator identifies, from the content, a first rendering component from the set of rendering components for use in rendering a first view of the user interface. The system then provides the content to the first rendering component, wherein the content is used by the first rendering component to render the first view of the user interface.

16 Claims, 5 Drawing Sheets

(56) References Cited

U.S. PATENT DOCUMENTS

| | | | |
|---|---|---|---|
| 7,814,107 B1 | 10/2010 | Thirumalai et al. | |
| 7,865,412 B1 | 1/2011 | Weiss et al. | |
| 8,356,276 B2 | 1/2013 | Bender | |
| 8,909,548 B1 | 12/2014 | Ran et al. | |
| 8,924,269 B2 | 12/2014 | Seubert et al. | |
| 8,930,253 B1 | 1/2015 | Ball | |
| 8,996,407 B2 | 3/2015 | Weiss et al. | |
| 9,286,332 B1 | 3/2016 | Roumeliotis et al. | |
| 9,400,660 B1* | 7/2016 | Krivopaltsev | G06F 3/04842 |
| 2001/0011250 A1 | 8/2001 | Paltenghe et al. | |
| 2002/0165880 A1 | 11/2002 | Hornsby et al. | |
| 2004/0135807 A1 | 7/2004 | Pickering et al. | |
| 2004/0143502 A1 | 7/2004 | McClung | |
| 2005/0060647 A1 | 3/2005 | Doan et al. | |
| 2005/0114361 A1 | 5/2005 | Roberts et al. | |
| 2006/0041546 A1 | 2/2006 | Ahn | |
| 2006/0174217 A1 | 8/2006 | Yan et al. | |
| 2006/0200749 A1 | 9/2006 | Shenfield | |
| 2006/0242124 A1 | 10/2006 | Fields et al. | |
| 2006/0242566 A1 | 10/2006 | Dunietz et al. | |
| 2007/0050778 A1 | 3/2007 | Lee et al. | |
| 2007/0073683 A1 | 3/2007 | Kobayashi et al. | |
| 2007/0078925 A1 | 4/2007 | Neil et al. | |
| 2007/0162274 A1 | 7/2007 | Ruiz et al. | |
| 2007/0238475 A1 | 10/2007 | Goedken | |
| 2008/0065569 A1 | 3/2008 | Dutt et al. | |
| 2008/0091784 A1 | 4/2008 | Sundstrom | |
| 2010/0199198 A1 | 8/2010 | Relyea | |
| 2011/0023016 A1 | 1/2011 | Khader et al. | |
| 2011/0093514 A1 | 4/2011 | Brown et al. | |
| 2011/0154305 A1 | 6/2011 | LeRoux et al. | |
| 2011/0282714 A1 | 11/2011 | Cullen, III et al. | |
| 2012/0084185 A1 | 4/2012 | Ciaramitaro et al. | |
| 2012/0226708 A1 | 9/2012 | Srinivasa et al. | |
| 2012/0323889 A1 | 12/2012 | Marum et al. | |
| 2013/0024766 A1* | 1/2013 | Gupta | G06F 17/211 715/249 |
| 2013/0117351 A1 | 5/2013 | Zoheir et al. | |
| 2013/0159228 A1 | 6/2013 | Meijer et al. | |
| 2013/0283305 A1 | 10/2013 | Hirsch et al. | |
| 2014/0052840 A1* | 2/2014 | Shukla | G06F 9/44505 709/223 |
| 2014/0125672 A1 | 5/2014 | Winternitz et al. | |
| 2014/0129397 A1 | 5/2014 | Lazerson | |
| 2014/0136954 A1* | 5/2014 | Ligman | G06F 17/2247 715/234 |
| 2014/0136955 A1 | 5/2014 | Lee et al. | |
| 2014/0201616 A1 | 7/2014 | Turner et al. | |
| 2014/0229814 A1 | 8/2014 | Wright et al. | |
| 2014/0245122 A1 | 8/2014 | Oro et al. | |
| 2014/0280515 A1 | 9/2014 | Wei et al. | |
| 2014/0337414 A1* | 11/2014 | Sojoodi | H04W 4/003 709/203 |
| 2015/0310052 A1 | 10/2015 | Konik et al. | |
| 2016/0027107 A1 | 1/2016 | McDonald et al. | |
| 2016/0036935 A1* | 2/2016 | Jaskiewicz | H04L 67/2842 709/217 |
| 2016/0055126 A1* | 2/2016 | Doerr | H04L 67/10 715/745 |
| 2016/0078567 A1 | 3/2016 | Goldman et al. | |
| 2016/0092994 A1 | 3/2016 | Roebuck et al. | |
| 2016/0094612 A1* | 3/2016 | Lockhart | H04L 67/02 709/217 |

OTHER PUBLICATIONS

Gitana Software Inc., "Alpaca-Easy Forms for Jquery—Tools & Addons", Jun. 25, 2014, Retrieved from the Internet on Jul. 2, 2018: URL:https://web.archive.org/web/20140625105117/http://alpacajs.org/web/resources.html (1 page).

Anonymous: "Gitana/alpaca_GitHub Readme.md", Oct. 16, 2013, Retrieved from the Internet on Jul. 2, 2018: URL: https://web.archive.org/web20131016124514/https://github.com/gitana/alpaca (4 pages).

Anonymous: "jQuery Mobile—Wikipedia", Aug. 6, 2014, Retreived from the Internet on Jul. 2, 2018: URL:https://en.wikipedia.org/windex.php?tille=jQuery_Mobile%oldid=620090108 (11 pages).

International Search Report and Written Opinion issued in corresponding PCT/US2014/072553 dated Jun. 30, 2015 (8 pages).

International Search Report and Written Opinion issued in corresponding PCT/US2014/072559 dated Jul. 28, 2015 (8 pages).

International Search Report and Written Opinion issued in corresponding application No. PCT/US2014/072535 dated Jul. 29, 2015 (11 pages).

International Search Report and Written Opinion issued in corresponding application No. PCT/US2014/072543 dated Jul. 29, 2015 (11 pages).

International Search Report and Written Opinion issued in the corresponding International Application No. PCT/2014/053168, dated Apr. 30, 2015 (11 pages).

Extended European Search Report in related European Patent Application No. 14879253.4 dated Apr. 23, 2018 (11 pages).

Office Action in related Canadian Application No. 2,966,388 dated Jun. 1, 2017 (6 page).

* cited by examiner

CONTENT-DRIVEN ORCHESTRATION OF MULTIPLE RENDERING COMPONENTS IN USER INTERFACES OF ELECTRONIC DEVICES

RELATED APPLICATIONS

The subject matter of this application is related to the subject matter in a co-pending non-provisional application by inventors Eugene Krivopaltsev, Marc Attinasi and Shailesh Soliwal and filed on the same day as the instant application, entitled "Metadata-Driven Binding of Platform-Agnostic Content to Platform-Specific User-Interface Elements," having Ser. No. 14/813,013 and filing date Jul. 29, 2015.

The subject matter of this application is also related to the subject matter in a co-pending non-provisional application by inventors Eugene Krivopaltsev, Marc Attinasi and Shailesh Soliwal and filed on the same day as the instant application, entitled "Context-Aware Component Styling in User Interfaces of Electronic Devices," having Ser. No. 14/813,019 and filing date Jul. 29, 2015.

BACKGROUND

Related Art

The disclosed embodiments relate to user interfaces on electronic devices. More specifically, the disclosed embodiments relate to techniques for content-driven orchestration of multiple rendering components in user interfaces of electronic devices.

A user typically interacts with an electronic device, such as a personal computer, laptop computer, tablet computer, mobile phone, digital media receiver, and/or portable media player, by providing input to and receiving output from the electronic device through various input and output mechanisms. For example, the user may enter input into a laptop computer using a keyboard, mouse, and/or touchpad and receive output from the laptop computer via a display screen and/or speakers.

Applications on the electronic device may provide user interfaces (UIs) that facilitate interaction between the user and the electronic device. In addition, the UIs may be tailored to the input/output (I/O) devices and/or form factor of the electronic device. For example, a graphical user interface (GUI) of an application on a tablet computer may provide UI components such as windows, menus, icons, checkboxes, text boxes, and/or radio buttons. These UI components may be displayed to the user through a touchscreen of the tablet computer. In turn, the touchscreen may allow the user to manipulate the UI components using gestures such as swiping, zooming, and/or tapping. Because the tablet computer may lack a physical keyboard, the touchscreen may also provide a virtual keyboard that allows the user to enter alphanumeric input into the tablet computer.

Usability is an important consideration in designing user interfaces. In particular, usability considerations may include: the efficiency with which tasks are accomplished through the UI; the user's ability to learn and master the operation of the UI; and/or the availability of feedback, help, documentation, and/or status information within the UI. For example, the user may accomplish tasks more easily and quickly if UI elements are arranged and displayed in a meaningful way within the UI. Consequently, user satisfaction with an application on an electronic device may be highly influenced by characteristics of the user interface provided by the application and/or the user's ability to interact with the user interface through I/O devices of the electronic device.

SUMMARY

As variations in the form factors, platforms, and technologies of electronic devices continue to increase, applications may be required to adapt to the variations. For example, different versions of an application may be released to support execution on different processors, input/output (I/O) devices, operating systems, screen sizes, and/or web browsers.

When an application is updated to support new features, functionality, platforms, form factors, or technologies, portions of the application's user interface may be provided by new rendering components. For example, the application may include a web view rendering component that embeds web pages within screens of the user interface, as well as one or more native rendering components that use various technologies (e.g., programming languages, libraries, hardware components, etc.) to natively render user-interface components in the user interface.

To coordinate execution of disparate rendering components, an orchestrator may load the rendering components, provide content for rendering the user interface to the rendering components, and use the rendering components to render views of the user interface from the content. The orchestrator may also operate in a way that maintains a seamless user experience in the application. For example, the orchestrator may retrieve content for a next view of the user interface based on the current usage context of the application, identify the rendering component to be used in rendering the next view, and use the rendering component to render the next view in time for the next view to be displayed within the user interface. Because the operation of the orchestrator is decoupled from the content and/or the navigation flow of the user interface, the orchestrator may enable flexible, dynamic configuration of rendering components and views within user interfaces of applications.

The disclosed embodiments provide a system that facilitates use of an application on an electronic device. During operation, the system executes an orchestrator that coordinates the operation of a set of rendering components for rendering different views of a user interface for the application. The orchestrator is used to provide the user interface on the electronic device. First, the orchestrator obtains content for rendering the user interface. Next, the orchestrator identifies, from the content, a first rendering component from the set of rendering components for use in rendering a first view of the user interface. The system then provides the content to the first rendering component, wherein the content is used by the first rendering component to render the first view of the user interface.

In some embodiments, upon detecting user input for navigating from the first view to a second view of the user interface, the orchestrator identifies a second rendering component from the set of rendering components for use in rendering the second view. Next, the orchestrator provides the content to the second rendering component, wherein the content is used by the second rendering component to render the second view of the user interface.

In some embodiments, identifying the second rendering component includes obtaining a selection of the second rendering component based on a current usage context of the application.

In some embodiments, the current usage context includes a currently displayed view of the user interface.

In some embodiments, after the first rendering component is selected, the orchestrator obtains additional content for rendering the first view. Next, the orchestrator provides the additional content to the first rendering component.

In some embodiments, the orchestrator also provides an application context of the application to the first rendering component for use in rendering the first view of the user interface.

In some embodiments, identifying the first rendering component for use in rendering the first view includes obtaining a type of rendering component for the first view from the content, and selecting the first rendering component to match the type.

In some embodiments, the rendering components include a native rendering component and a web view rendering component.

In some embodiments, the content for configuring the user interface is obtained from a configuration file.

In some embodiments, the user interface is rendered using different technologies by the set of rendering components.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

As variations in the form factors, platforms, and technologies of electronic devices continue to increase, applications may be required to adapt to the variations. For example, different versions of an application may be released to support execution on different processors, input/output (I/O) devices, operating systems, screen sizes, and/or web browsers.

When an application is updated to support new features, functionality, platforms, form factors, or technologies, portions of the application's user interface may be provided by new rendering components. For example, the application may include a web view rendering component that embeds web pages within screens of the user interface, as well as one or more native rendering components that use various technologies (e.g., programming languages, libraries, hardware components, etc.) to natively render user-interface components in the user interface.

To coordinate execution of disparate rendering components, an orchestrator may load the rendering components, provide content for rendering the user interface to the rendering components, and use the rendering components to render views of the user interface from the content. The orchestrator may also operate in a way that maintains a seamless user experience in the application. For example, the orchestrator may retrieve content for a next view of the user interface based on the current usage context of the application, identify the rendering component to be used in rendering the next view, and use the rendering component to render the next view in time for the next view to be displayed within the user interface. Because the operation of the orchestrator is decoupled from the content and/or the navigation flow of the user interface, the orchestrator may enable flexible, dynamic configuration of rendering components and views within user interfaces of applications.

Figure 1:
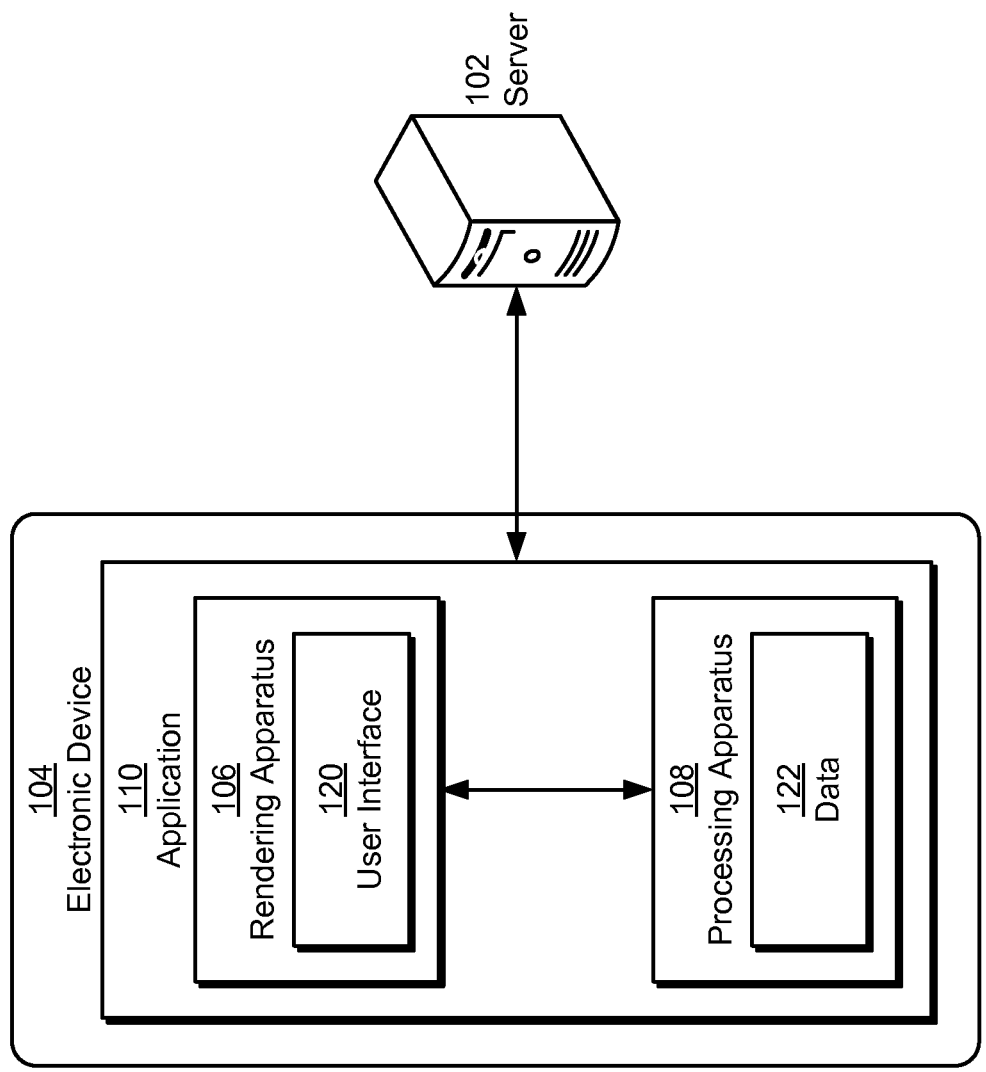
FIG. 1 shows a schematic of a system in accordance with the disclosed embodiments.

The disclosed embodiments provide a method and system for facilitating use of an application on an electronic device. As shown in FIG. 1, an application 110 may reside on an electronic device 104 such as a mobile phone, personal computer, laptop computer, tablet computer, personal digital assistant, navigation system, digital camera, smart watch, and/or portable media player. For example, application 110 may be downloaded from an online application distribution platform, website, and/or server (e.g., server 102) and installed locally on electronic device 104. Alternatively, application 110 may be a web application that is loaded in a web browser of electronic device 104.

Application 110 may perform a set of tasks for a user of electronic device 104. For example, application 110 may allow the user to browse websites, send and receive emails, access and/or organize digital media, create and edit documents, play a game, use mapping and/or navigation services, file taxes, and/or manage personal finances.

During use of application 110, electronic device 104 may use a network connection to obtain data 122 and/or content associated with application 110 from a server 102 and transmit data from application 110 to server 102. For example, electronic device 104 may use a wired, wireless and/or cellular network to send and receive emails, financial information, digital media, game play information, and/or other data 122 or content used by application 110 with server 102. As a result, application 110 may execute using a client-server model.

In addition, interaction between the user and application 110 may be enabled by a user interface 120. For example, user interface 120 may be a graphical user interface (GUI) that displays text, images, documents, menus, icons, thumbnails, form fields, data, buttons, and/or other user-interface elements to the user. The GUI may also accept user input (e.g., gestures, keyboard presses, etc.) that is used to manipulate and/or update the elements. In other words, user interface 120 may be a mechanism for displaying or formatting data 122 or content associated with application 110 for use on electronic device 104.

In one or more embodiments, a rendering apparatus 106 in application 110 generates user interface 120 using content obtained from server 102. For example, rendering apparatus 106 may obtain structured data in one or more Extensible Markup Language (XML) documents, JavaScript Object Notation (JSON) objects, and/or other types of structured, platform-agnostic data. Rendering apparatus 106 may then use natively executing user-interface components to render one or more views or screens of user interface 120 specified in the structured data. In addition, rendering of user interface 120 may vary with the platform and/or type of electronic device 104. For example, rendering apparatus 106 may tailor the layout of the views in user interface 120 based on the dimensions, orientation (e.g., portrait, landscape, etc.), form factor, and/or input/output (I/O) devices of electronic device 104.

Data 122 collected through user interface 120 may then be used by a processing apparatus 108 in application 110 to perform one or more tasks for the user. For example, processing apparatus 108 may validate data 122, format data 122, use data 122 entered by the user to update a state of application 110, use data 122 to generate additional data or files, and/or commit data 122 to storage on electronic device 104 and/or server 102.

In one or more embodiments, rendering apparatus 106 is provided by multiple rendering components that are implemented using different technologies. For example, application 110 may be a tax-preparation application that executes on a mobile device such as a mobile phone, tablet computer, and/or portable media player. New versions of application 110 may be released yearly to accommodate new features, modes of operation, and/or changes in tax code or technology. As portions of application 110 are added or updated, different rendering components may be included in application 110 to support the rendering of user-interface views or components in those portions. As a result, user interface 120 may be provided by rendering components associated with early versions of application 110, widgets added to provide new features to application 110, third-party widgets by third-party developers, rendering components to support platform-specific execution of application 110, and/or web view rendering components that render embedded web pages within user interface 120.

As a new rendering component is added to application 110, rendering apparatus 106 may be modified to support use of the new rendering component. For example, source code for rendering apparatus 106 may be updated to include screens rendered by the new rendering component in the navigation flow of user interface 120. At the same time, rendering apparatus 106 may be required to maintain a uniform user experience across application 110. For example, rendering apparatus 106 may apply uniform navigation paradigms, gestures, screen transitions, and/or styles across all portions of user interface 120 to hide the complexity of using multiple rendering components in application 110 from the user. Consequently, the addition of new rendering components to application 110 may involve significant overhead in adapting the execution of rendering apparatus 106 to accommodate the new rendering components within the uniform user experience of application 110.

In one or more embodiments, application 110 includes functionality to decouple the coordination of multiple rendering components from the hardcoded functionality of rendering apparatus 106. Such decoupling of user-interface content from the platform in which the content is rendered may allow updates to user interface 120 to be deployed without changing the source code used to execute the application.

Figure 2:
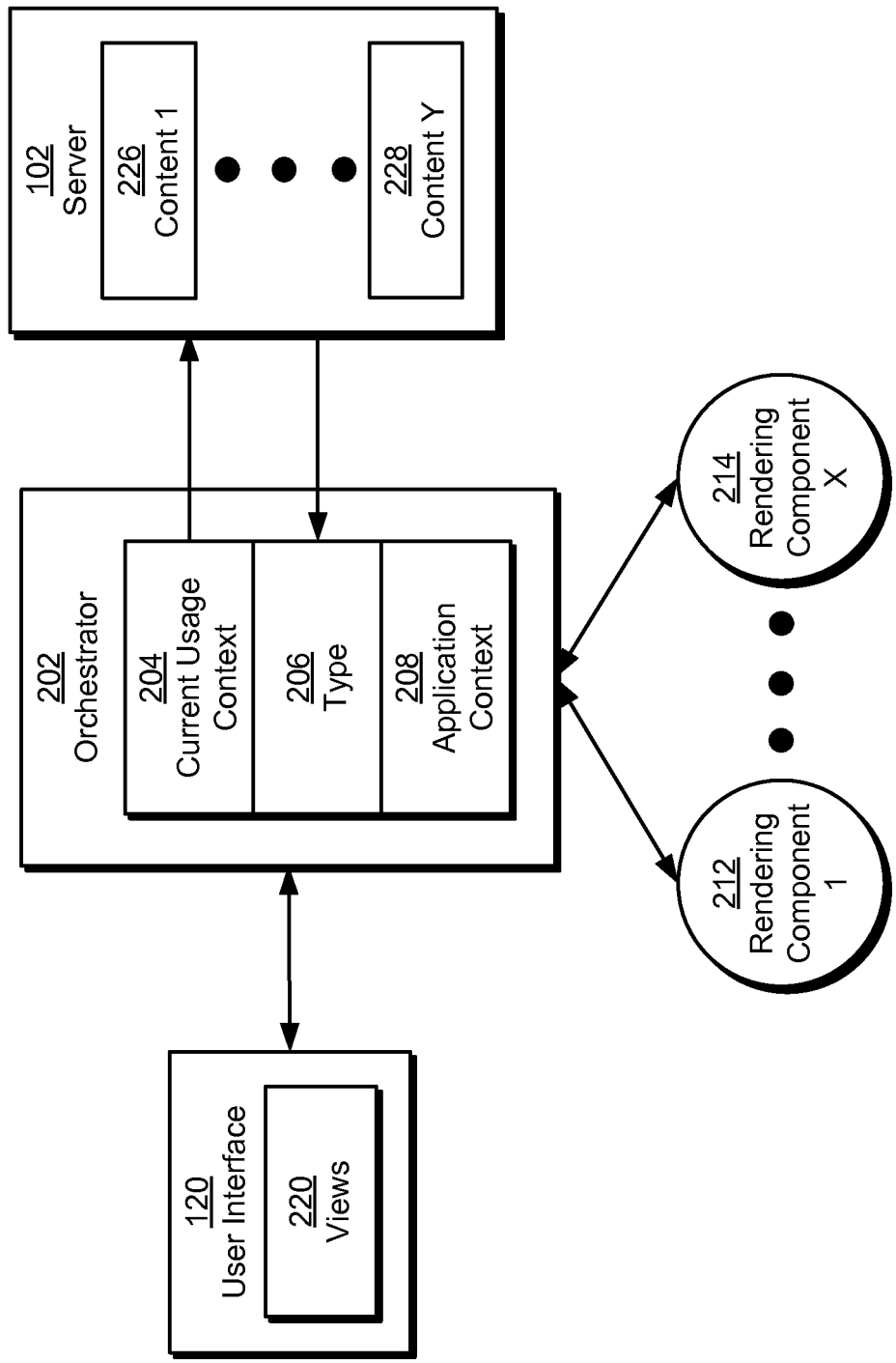
FIG. 2 shows a system for facilitating use of an application on an electronic device in accordance with the disclosed embodiments.

As shown in FIG. 2, an orchestrator 202 may coordinate the rendering of a set of views 220 in user interface 120 by a set of rendering components (e.g., rendering component 1 212, rendering component x 214). The rendering components and orchestrator 202 may execute within a rendering apparatus of an application, such as rendering apparatus 106 of FIG. 1. The rendering components and orchestrator 202 may also use a standardized communications mechanism, such as an application-programming interface (API), to communicate with one another.

Orchestrator 202 may obtain content (e.g., content 1 226, content y 228) for use in rendering user interface 120 from server 102. As mentioned above, the content may be obtained as structured, platform-agnostic data. For example, the content may include one or more JSON objects that describe a set of views 220, a navigation flow associated with views 220, a set of data elements, and/or a data model for the data elements. The described views 220 may specify the text, images, and/or user-interface elements to be included in screens of user interface 120. The described navigation flow may specify the order in which screens of user interface 120 are to be displayed, such as a linear or non-linear flow through screens of user interface 120 that is based on a state of the application and/or data entered into the application by the user. The described data elements may include the names of the data elements, as well as any values of the data elements entered by the user and/or obtained from an external source (e.g., tax forms, public records, emails, etc.). The described data model may specify the data types of the data elements, such as text, Boolean, enumerated, numeric, date, currency, and/or other data types that may be specific to the application.

Content from server 102 may also be tailored to the execution of different rendering components for user interface 120. For example, content for a native rendering component may include the JSON data described above, while content for a web view rendering component may include a Uniform Resource Locator (URL) of a web page to be embedded in user interface 120.

As mentioned above, orchestrator 202 may maintain a seamless user experience by applying the same navigation paradigms, gestures, screen transitions, and/or styles across views 220 of user interface 120. As the user navigates from a first view to a second view, orchestrator 202 may retrieve content for the second view from server 102, analyze the content to identify the rendering component to be used in rendering the second view, and provide the content to the rendering component. The rendering component may use the content to render the second view, and orchestrator 202 and/or another component of the rendering apparatus may display the second view in user interface 120.

More specifically, orchestrator 202 may initialize once the user loads the application and/or establishes a session with the application. While the user interacts with the application through user interface 120, orchestrator 202 may obtain a current usage context 204 from user interface 120 and/or another component of the application. Current usage context 204 may include the current view of user interface 120, data entered into user interface 120, a user mode (e.g., level of difficulty, accessibility mode, etc.) associated with the application, and/or other information that establishes the current state of the application. In other words, current usage context 204 may represent the conditions under which the application is currently used.

When the user provides input for navigating to a different view of user interface 120, orchestrator 202 may provide current usage context 204 to server 102, and server 102 may respond with content for rendering the view. For example, the user may use a swiping gesture, button press, voice command, keyboard shortcut, and/or other input to navigate from the currently displayed screen to another screen such as the next screen in the navigation flow, the previous screen in the navigation flow, a help screen, and/or a main menu screen. In response to the input, orchestrator 202 may request content for rendering the other screen from server 102 and provide the type of input, an identifier for the currently displayed screen and/or any data entered into the currently displayed screen or associated with current usage context 204 to server 102. Server 102 may use the identifier and/or data to select content for rendering the other screen and transmit the content to orchestrator 202.

After the content is returned by server 102, orchestrator 202 may identify the rendering component to be used in rendering a view from the content. To identify the rendering component, orchestrator 202 may obtain a type 206 from the content and select the rendering component to match type 206. For example, orchestrator 202 may obtain a numeric identifier representing type 206 from a JSON object that describes the view. Orchestrator 202 may then match the identifier to the rendering component associated with the identifier.

Alternatively, orchestrator 202 may use other sources of information to identify the rendering component to be used with the content. For example, the application and/or server 102 may provide a separate configuration file that describes the navigation flow of user interface 120 and the rendering component used to render each screen in the navigation flow. When the user navigates to a given screen in the navigation flow, orchestrator 202 may identify the view to be displayed in the screen from the configuration file, request content for the view from server 102, and provide the content to the rendering component associated with the view in the configuration file.

Orchestrator 202 may then provide the content to the selected rendering component, and the rendering component may render the view using the content. Alternatively, one or more views 220 in user interface 120 may be rendered by orchestrator 202 instead of a separate rendering component. Orchestrator 202, user interface 120, and/or another component of the rendering apparatus may then transition from displaying the currently displayed view to displaying the newly rendered view within user interface 120. For example, the component may shift the currently displayed view off of user interface 120 in the direction of a swiping gesture by the user and shift the newly rendered view onto user interface 120 in the same direction as the currently displayed view is shifted off. Coordinating the rendering and display of views in user interfaces with multiple rendering components is described in further detail below with respect to FIG. 3.

To ensure that views 220 maintain a uniform user experience across application 110, orchestrator 202 may also provide an application context 208 with the content to the rendering component. Application context 208 may identify a variation or version of the application that is currently used by the user. For example, application context 208 for a tax-preparation application may include the tax year for which taxes are to be prepared, the version of the content obtained from server 102, and/or other information that can be used to render a view that conforms to a given style of user interface 120. The rendering component may use application context 208 and the content to select a style context for each platform-agnostic view component in the view and render the view component according to the style context. Using style contexts to render view components in user interface views is described in a co-pending non-provisional application by inventors Eugene Krivopaltsev, Marc Attinasi and Shailesh Soliwal and filed on the same day as the instant application, entitled "Context-Aware Component Styling in User Interfaces of Electronic Devices," having Ser. No. 14/813,019 and filing date Jul. 29, 2015, which is incorporated herein by reference.

Such decoupling of user-interface content from the platform in which the content is rendered may allow updates to user interface 120 to be deployed without changing the source code used to execute the application. For example, a designer or developer may upload a new version of the content to server 102. Once the new version of content is available in server 102, server 102 may provide the new version to orchestrator 202, and orchestrator 202 may use the rendering component that matches type 206 in the content to generate one or more views 220 in user interface 120 from the new version instead of previous versions of the content.

Moreover, the dynamic, content-based selection of a rendering component for rendering a view in user interface 120 may allow different sets of rendering components to be integrated into a seamless, context-based user experience with the application by selecting and displaying different subsets of possible screens in user interface 120 without modifying the execution of orchestrator 202. For example, a third-party widget may be added to the application by providing a rendering component for the widget, adding content used by the rendering component to server 102, and serving the content to orchestrator 202 when the widget is to be displayed in user interface 120. Consequently, the system of FIG. 2 may provide flexible, content-driven orchestration of multiple rendering components (e.g., rendering component 1 212, rendering component x 214) in user interfaces (e.g., user interface 120) of electronic devices.

Figure 3:
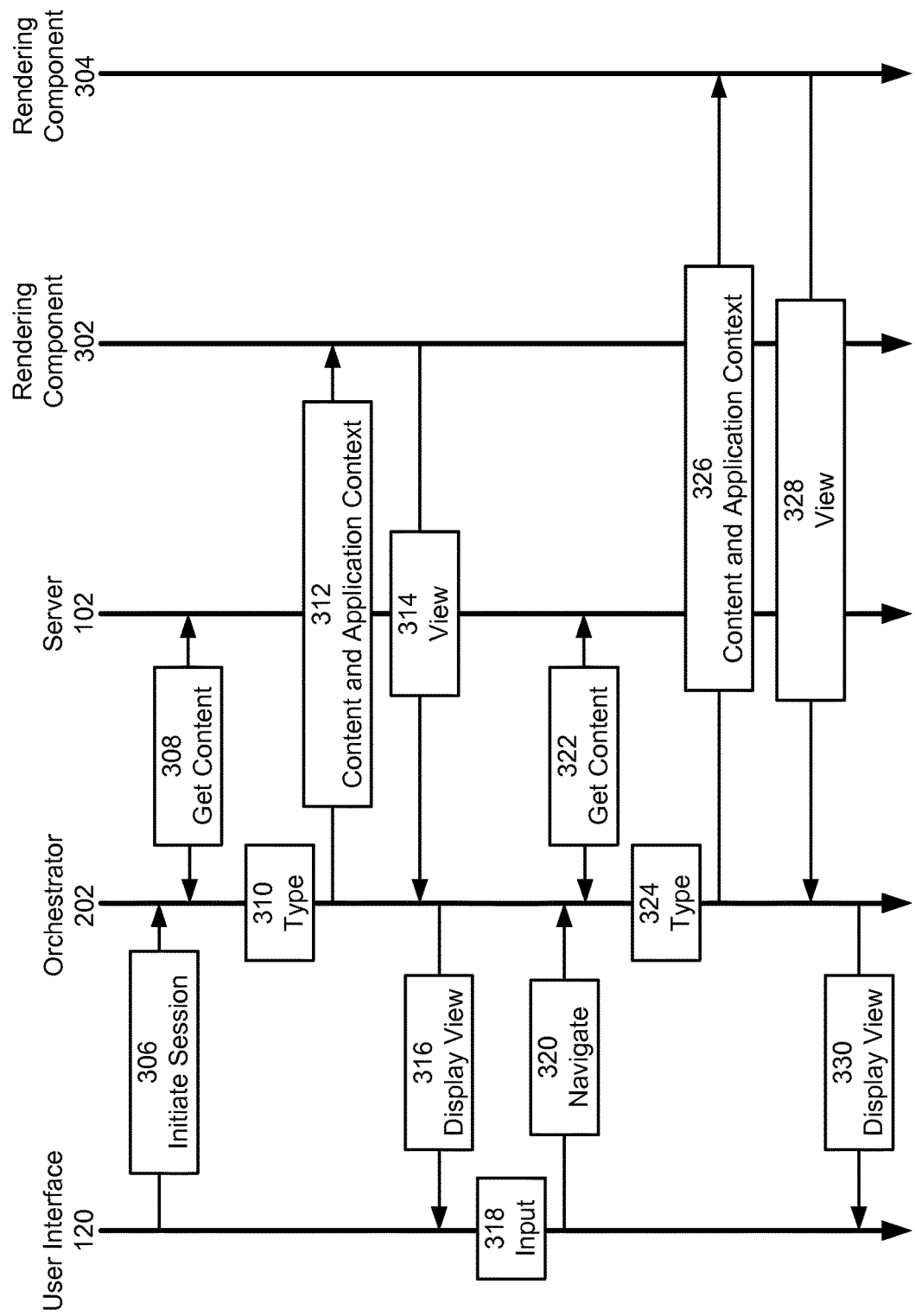
FIG. 3 shows an exemplary sequence of operations involved in providing a user interface of an application in accordance with the disclosed embodiments.

FIG. 3 shows an exemplary sequence of operations involved in providing user interface 120 of an application (e.g., application 110 of FIG. 1) in accordance with the disclosed embodiments. As shown in FIG. 3, the sequence begins with the initiation of a session 306 with the application through user interface 120. For example, the user may initiate the session by loading the application and/or logging in to the application.

Next, orchestrator 202 may obtain content 308 for rendering a view of user interface 120 from server 102. For example, orchestrator 202 may provide a current usage context containing the current screen and/or state (e.g., a newly initialized state) of the application to server 102, and server 102 may respond with content for the view based on the application context. Alternatively, orchestrator 202 may use a configuration file to match the current usage context to a specific view and obtain content matching an identifier for the view from server 102.

After receiving the content from server 102, orchestrator 202 may identify a rendering component 302 for use in rendering the view from a type 310 in the content. For example, the content may include the following JSON object:

"view": {
　"regions": [ {
　　"cL": [
　　　{
　　　　"curFld": null,
　　　　"pT": 18,
　　　　"historyType": " ",
　　　　"curForm": null,
　　　　"tag": "DialogWelcome",
　　　　"engL": [ ],
　　　　"type": 1,
　　　}]
　}]

The JSON object may include a "type" of 1, which may identify the use of rendering component 302 with the content.

In response to the identified type 310, orchestrator 202 may transmit the content and an application context 312 to rendering component 302, and rendering component 302 may render the view 314 using the content and application context 312. For example, orchestrator 202 may provide the version of the content and/or a variation of the application used by the user with the content, and rendering component 302 may render the view in a way that adheres to a uniform style associated with the version of the content and/or variation of the application.

After the view is rendered, orchestrator 202 may display the view 316 within user interface 120, and the user may interact with the view through user interface 120. For example, the user may provide input 318 to user interface 120, and user interface 120 may obtain data from the user and/or update the appearance of user-interface elements in the view based on the input 318.

Input 318 may also be used to navigate 320 from the view to another view in user interface 120. For example, the user may navigate to a new view of user interface 120 by selecting a button, performing a swiping gesture, generating a voice command, providing a keyboard shortcut, and/or providing other input that is supported by user interface 120. In response to the input, orchestrator 202 may obtain content 322 from server 102 for rendering the new view. For example, orchestrator 202 may provide the current view displayed in user interface 120, any data entered in the view, and input (e.g., leftward swipe, rightward swipe, button pressed, etc.) as the current usage context to server 102, and server 102 may respond with new content for the new view to be shown based on the current view, data, and/or input.

After receiving the new content from server 102, orchestrator 202 may use the new content to identify the type 324 of a rendering component 304 to be used in rendering the new view. For example, the new content may include the following JSON object:
"view": {
  "regions": [ {
    "cL": [
    {
      "curFld": null,
      "pT": 18,
      "historyType": " ",
      "curForm": null,
      "tag": "PersonalInfo",
      "engL": [ ],
      "type": 0,
    }]
  }]
}

The JSON object may include a "type" of 0, which identifies the use of rendering component 304 and not rendering component 302 with the new content.

In response to the identified type 324, orchestrator may provide the new content and application context 326 to rendering component 304, and rendering component 304 may render the new view 328 from the new content and application context. Orchestrator 202 may then display the new view 330 in user interface 120.

Figure 4:
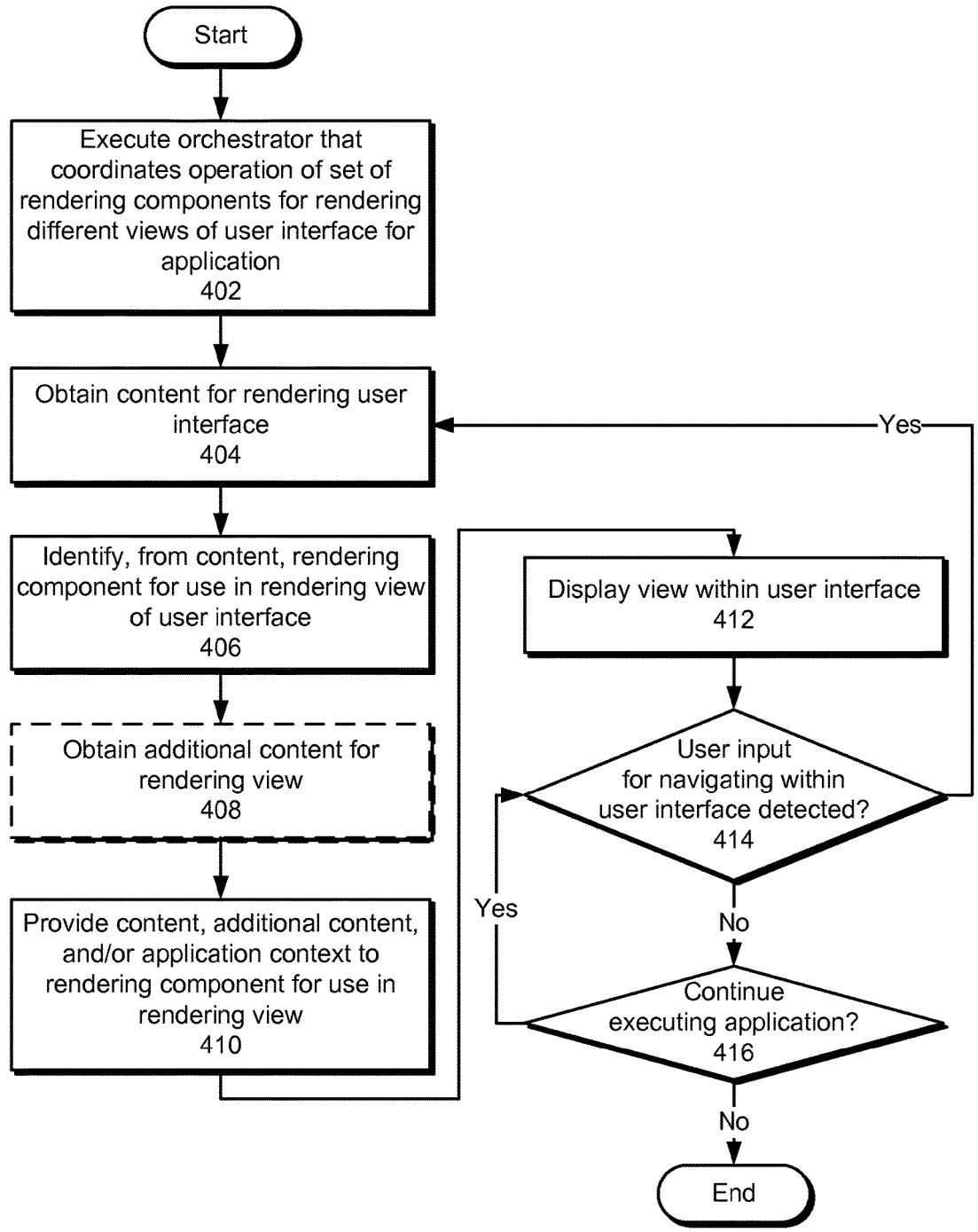
FIG. 4 shows a flowchart illustrating the process of facilitating use of an application on an electronic device in accordance with the disclosed embodiments.

FIG. 4 shows a flowchart illustrating the process of facilitating use of an application on an electronic device in accordance with the disclosed embodiments. In one or more embodiments, one or more of the steps may be omitted, repeated, and/or performed in a different order. Accordingly, the specific arrangement of steps shown in FIG. 4 should not be construed as limiting the scope of the embodiments.

Initially, an orchestrator that coordinates the operation of a set of rendering components for rendering different views of a user interface for the application is executed (operation 402). For example, the orchestrator may be provided by a rendering apparatus of the application, such as rendering apparatus 106 of FIG. 1. The rendering components may use different technologies to render the user interface. For example, the rendering components may include one or more native rendering components that are implemented using a variety of programming languages and/or libraries, as well as a web view rendering component that renders embedded web pages within the user interface.

During execution, the orchestrator performs operations for providing a user interface of the application. First, the orchestrator obtains content for rendering the user interface (operation 404). The content may include structured data that describes a view of the user interface. For example, the orchestrator may provide a current usage context (e.g., currently displayed view, user input, data entered into the currently displayed view, etc.) of the application to a server, and the server may respond with the content based on the current usage context. Alternatively, the orchestrator may use a configuration file for the user interface to match the current usage context to a view to be rendered and request the view from the server.

Next, the orchestrator identifies, from the content, a rendering component for use in rendering a view of the user interface (operation 406). For example, the orchestrator may obtain a type of rendering component for the view from a JSON representation of the content and/or a configuration file and select the rendering component to match the type. Once the rendering component is identified, the orchestrator may optionally obtain additional content for rendering the view (operation 408). For example, the orchestrator may determine, based on the type of the rendering component, that the rendering component requires additional content to render the view. To facilitate operation of the rendering component, the orchestrator may make a service call to the server and/or another component to retrieve the additional content.

The orchestrator may then provide the content, additional content, and/or an application context of the application to the rendering component for use in rendering the view (operation 410). The application context may identify a version of the content and/or variation of the application currently used by the user. For example, the application context may specify a tax year for a tax-preparation application.

After the view is rendered by the rendering component, the orchestrator and/or another component in the application displays the view within the user interface (operation 412). The user may then interact with user-interface components in the view by providing input through the user interface.

The user may also provide input for navigating within the user interface (operation 414). If user input for navigating within the user interface is not detected, the view may continue to be displayed within the user interface while the application is executed (operation 416). If user input for navigating within the user interface is detected, the orchestrator obtains content for rendering the next view of the user interface (operation 404) based on the user input. For example, the orchestrator may provide the user input (e.g., selection of a user-interface element, gesture, direction of gesture, etc.), the currently displayed view, data entered into the currently displayed view, and/or other aspects of the current usage context of the application to the server, and the server may respond with content based on the current usage context. The orchestrator may identify the rendering component for the next view from the content (operation 406), optionally obtain additional content for rendering the next view (operation 408), and provide the content, additional content, and/or application context to the rendering component (operation 410). Once the next view is rendered, the next view is displayed within the user interface (operation 412). The orchestrator may repeat the above-described process as long as the application is executed (operation 416). Once execution of the application is discontinued (e.g., the application is shut down), operation of the orchestrator may cease.

Figure 5:
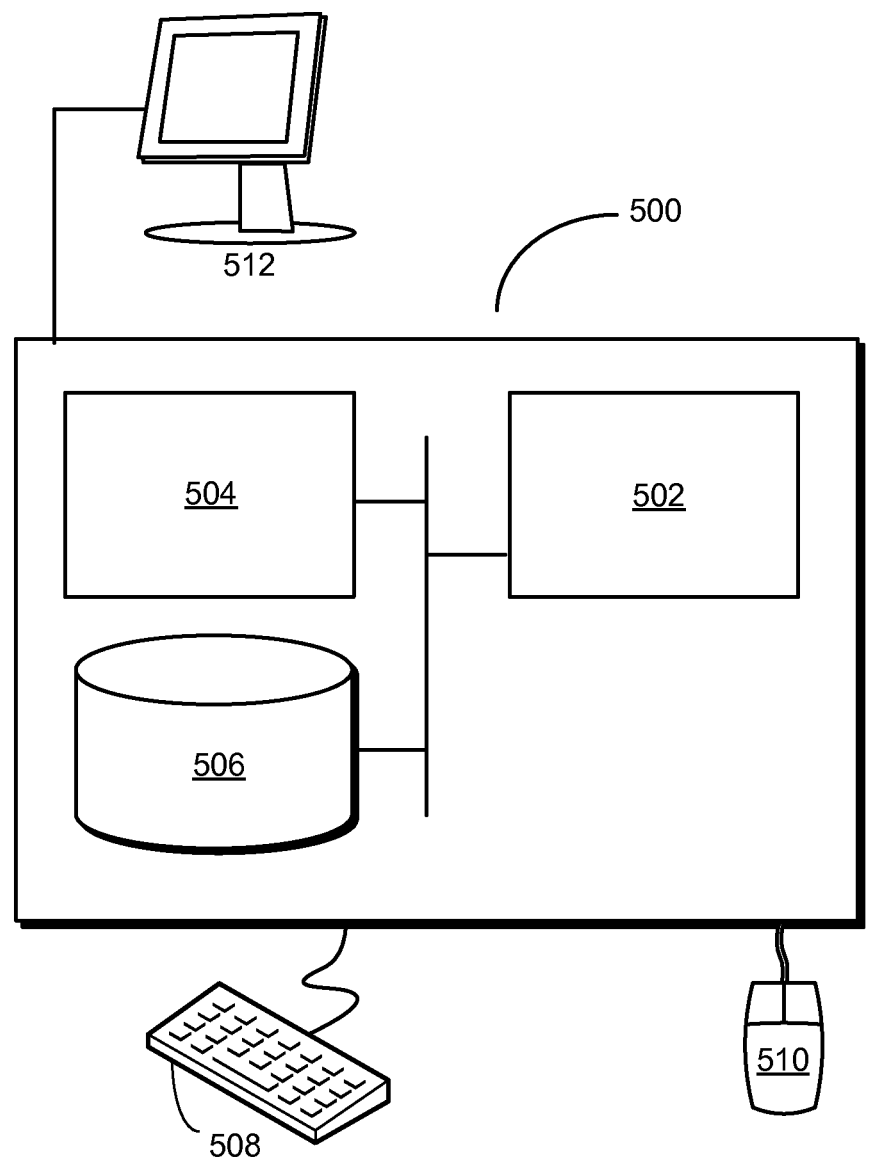
FIG. 5 shows a computer system in accordance with the disclosed embodiments.

FIG. 5 shows a computer system 500 in accordance with an embodiment. Computer system 500 may correspond to an apparatus that includes a processor 502, memory 504, storage 506, and/or other components found in electronic computing devices. Processor 502 may support parallel processing and/or multi-threaded operation with other processors in computer system 500. Computer system 500 may also include input/output (I/O) devices such as a keyboard 508, a mouse 510, and a display 512.

Computer system 500 may include functionality to execute various components of the present embodiments. In particular, computer system 500 may include an operating system (not shown) that coordinates the use of hardware and software resources on computer system 500, as well as one or more applications that perform specialized tasks for the user. To perform tasks for the user, applications may obtain the use of hardware resources on computer system 500 from the operating system, as well as interact with the user through a hardware and/or software framework provided by the operating system.

In one or more embodiments, computer system 500 provides a system for facilitating use of an application on an electronic device. The system may include an orchestrator that coordinates the operation of a set of rendering components for rendering different views of a user interface for the application. The orchestrator may obtain content for rendering the user interface. Next, the orchestrator may identify, from the content, a first rendering component from the set of rendering components for use in rendering a first view of the user interface. The orchestrator may then provide the content to the first rendering component for use in rendering a first view of the user interface by the first rendering component.

Upon detecting user input for navigating from the first view to a second view of the user interface, the orchestrator may identify a second rendering component for use in rendering the second view. The orchestrator may also provide the content to the second rendering component for use in rendering the second view of the user interface.

In addition, one or more components of computer system 500 may be remotely located and connected to the other components over a network. Portions of the present embodiments (e.g., rendering apparatus, processing apparatus, orchestrator, rendering components, server, etc.) may also be located on different nodes of a distributed system that implements the embodiments. For example, the present embodiments may be implemented using a cloud computing system that manages the rendering of platform-independent content by a set of platform-specific rendering components on a set of remote electronic devices.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method for facilitating use of an application on an electronic device, comprising:
executing, on a processor in the electronic device, an orchestrator that coordinates operations of a set of rendering components for rendering different views of a user interface for the application; and
providing, by the orchestrator, the user interface on the electronic device by:
obtaining content for rendering the user interface, wherein the content comprises an object that includes a type identifier;
identifying, from the content, a first rendering component from the set of rendering components for use in rendering a first view of the user interface by:
determining, based on the type identifier included in the object, a type of the content; and
identifying the first rendering component from the set of rendering components based on the type of the content;
determining, based on the type of the content, that the first rendering component requires additional content to render to the first view of the user interface;
obtaining the additional content via a service call; and
providing the content, the additional content, and an application context comprising a version of the content to the first rendering component, wherein the content, the additional content, and the application context are used by the first rendering component to render the first view of the user interface, and wherein the first rendering component maintains a uniform user experience comprising uniform navigation paradigms and uniform screen transitions for the application based on the application context by:

selecting a style context based on the content, the additional content, and the version of the content; and rendering the first view of the user interface according to the style context.

2. The method of claim 1, wherein providing the user interface on the electronic device further comprises:
upon detecting user input for navigating from the first view to a second view of the user interface, identifying a second rendering component from the set of rendering components for use in rendering the second view; and providing the content and the application context to the second rendering component, wherein the content and the application context are used by the second rendering component to render the second view of the user interface.

3. The method of claim 2, wherein identifying the second rendering component comprises: obtaining a selection of the second rendering component based on a current usage context of the application.

4. The method of claim 3, wherein the current usage context comprises a currently displayed view of the user interface.

5. The method of claim 1, wherein
the application context further comprises a variation of the application, and wherein selecting the style context is further based on the variation of the application.

6. The method of claim 1, wherein the set of rendering components comprise:
a native rendering component; and
a web view rendering component.

7. The method of claim 1, wherein the content for configuring the user interface is obtained from a configuration file.

8. The method of claim 1, wherein the user interface is rendered using different technologies by the set of rendering components.

9. An apparatus, comprising:
one or more processors; and
memory storing instructions that, when executed by the one or more processors, cause the apparatus to perform a method, the method comprising:
executing an orchestrator that coordinates operations of a set of rendering components for rendering different views of a user interface for an application on an electronic device; and
providing, by the orchestrator, the user interface on the electronic device by:
obtaining content for rendering the user interface, wherein the content comprises an object that includes a type identifier;
identifying, from the content, a first rendering component from the set of rendering components for use in rendering a first view of the user interface by:
determining, based on the type identifier included in the object, a type of the content; and
identifying the first rendering component from the set of rendering components based on the type of the content;
determining, based on the type of the content, that the first rendering component requires additional content to render to the first view of the user interface;
obtaining the additional content via a service call; and
providing the content, the additional content, and an application context comprising a version of the content to the first rendering component wherein the content the additional content, and the application context are used by the first rendering component to render the first view of the user interface, and wherein the first rendering component maintains a uniform user experience comprising uniform navigation paradigms and uniform screen transitions for the application based on the application context by:
selecting a style context based on the content, the additional content, and the version of the content; and rendering the first view of the user interface according to the style context.

10. The apparatus of claim 9, wherein providing the user interface on the electronic device further comprises:
upon detecting user input for navigating from the first view to a second view of the user interface, identifying a second rendering component from the set of rendering components for use in rendering the second view; and providing the content and the application context to the second rendering component, wherein the content and the application context are used by the second rendering component to render the second view of the user interface.

11. The apparatus of claim 9, wherein the application context further comprises a variation of the application, and wherein selecting the style context is further based on the variation of the application.

12. The apparatus of claim 9, wherein the set of rendering components comprise:
a native rendering component; and
a web view rendering component.

13. The apparatus of claim 9, wherein the content for configuring the user interface is obtained from a server.

14. A non-transitory computer-readable storage medium storing instructions that when executed by an electronic device cause the electronic device to perform a method for facilitating use of an application on the electronic device, the method comprising:
executing an orchestrator that coordinates operations of a set of rendering components for rendering different views of a user interface for the application; and
providing, by the orchestrator, the user interface on the electronic device by:
obtaining content for rendering the user interface, wherein the content comprises an object that includes a type identifier;
identifying, from the content, a first rendering component from the set of rendering components for use in rendering a first view of the user interface by:
determining, based on the type identifier included in the object, a type of the content; and
identifying the first rendering component from the set of rendering components based on the type of the content;
determining, based on the type of the content, that the first rendering component requires additional content to render to the first view of the user interface;
obtaining the additional content via a service call; and
providing the content, the additional content, and an application context comprising a version of the content to the first rendering component, wherein the content, the additional content, and the application context are used by the first rendering component to render the first view of the user interface, and wherein the first rendering component maintains a uniform user experience comprising uniform navigation paradigms and uniform screen transitions for the application based on the application context by:
selecting a style context based on the content, the additional content, and the version of the content; and
rendering the first view of the user interface according to the style context.

15. The non-transitory computer-readable storage medium of claim 14, wherein providing the user interface on the electronic device further comprises:
upon detecting user input for navigating from the first view to a second view of the user interface, identifying a second rendering component from the set of rendering components for use in rendering the second view; and
providing the content and the application context to the second rendering component, wherein the content and the application context are used by the second rendering component to render the second view of the user interface.

16. The non-transitory computer-readable storage medium of claim 14, wherein the application context further comprises a variation of the application, and wherein selecting the style context is further based on the variation of the application.

* * * * *